US012589506B2

(12) United States Patent
Ma et al.

(10) Patent No.: US 12,589,506 B2
(45) Date of Patent: Mar. 31, 2026

(54) HUMAN MACHINE INTERFACE, CONTROLLER, ROBOT AND CORRESPONDING SYSTEM AND METHOD

(71) Applicant: ABB SCHWEIZ AG, Baden (CH)

(72) Inventors: Bojun Ma, Shanghai (CN); Nana Tang, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 229 days.

(21) Appl. No.: 18/254,685

(22) PCT Filed: Nov. 27, 2020

(86) PCT No.: PCT/CN2020/132358
§ 371 (c)(1),
(2) Date: May 26, 2023

(87) PCT Pub. No.: WO2022/110046
PCT Pub. Date: Jun. 2, 2022

(65) Prior Publication Data
US 2024/0300114 A1      Sep. 12, 2024

(51) Int. Cl.
*B25J 13/06*          (2006.01)
(52) U.S. Cl.
CPC ..................................... *B25J 13/06* (2013.01)
(58) Field of Classification Search
CPC ................................ B25J 13/06; B25J 13/006
USPC ....................................................... 700/264
See application file for complete search history.

(56) References Cited

U.S. PATENT DOCUMENTS

| | | | |
|---|---|---|---|
| 10,286,547 B2 | 5/2019 | Takaichi | |
| 10,770,067 B1 | 9/2020 | Prasad | |
| 2006/0232236 A1* | 10/2006 | Calcagno | G05B 19/42 318/568.11 |
| 2008/0303690 A1* | 12/2008 | Chen | G08C 21/00 340/4.62 |
| 2014/0003820 A1 | 1/2014 | Lee | |
| 2014/0371912 A1 | 12/2014 | Passot et al. | |
| 2018/0071913 A1* | 3/2018 | Matsudaira | B25J 9/163 |
| 2018/0229363 A1* | 8/2018 | Kurihara | B25J 9/1674 |
| 2021/0090422 A1* | 3/2021 | Cho | H04W 4/029 |
| 2022/0203539 A1* | 6/2022 | Touma | B25J 13/006 |

FOREIGN PATENT DOCUMENTS

| | | |
|---|---|---|
| CN | 1725257 A | 1/2006 |
| CN | 1825378 A | 8/2006 |
| CN | 1853878 B | 5/2010 |
| CN | 101745765 A | 6/2010 |
| CN | 101927492 A | 12/2010 |
| CN | 102830677 A | 12/2012 |
| CN | 202837867 U | 3/2013 |

(Continued)

*Primary Examiner* — Kira Nguyen
(74) *Attorney, Agent, or Firm* — Greenberg Traurig, LLP

(57) ABSTRACT

Example embodiments of the present disclosure relate to a human machine interface, a controller, a robot, and corresponding systems and methods. The human machine interface is configured to control the robot via the controller. The method includes receiving a user input at the human machine interface; and transmitting a control signal to the controller in response to the user input, the control signal being configured to activate a first indication element arranged on the controller to identify the controller.

21 Claims, 4 Drawing Sheets

(56)  References Cited

FOREIGN PATENT DOCUMENTS

| | | | |
|---|---|---|---|
| CN | 103839400 | A | 6/2014 |
| CN | 106228211 | A | 12/2016 |
| CN | 106774855 | A | 5/2017 |
| CN | 107564261 | A | 1/2018 |
| CN | 110034985 | A | 7/2019 |
| EP | 1716982 | A1 | 11/2006 |
| KR | 20140002417 | A | 1/2014 |

* cited by examiner

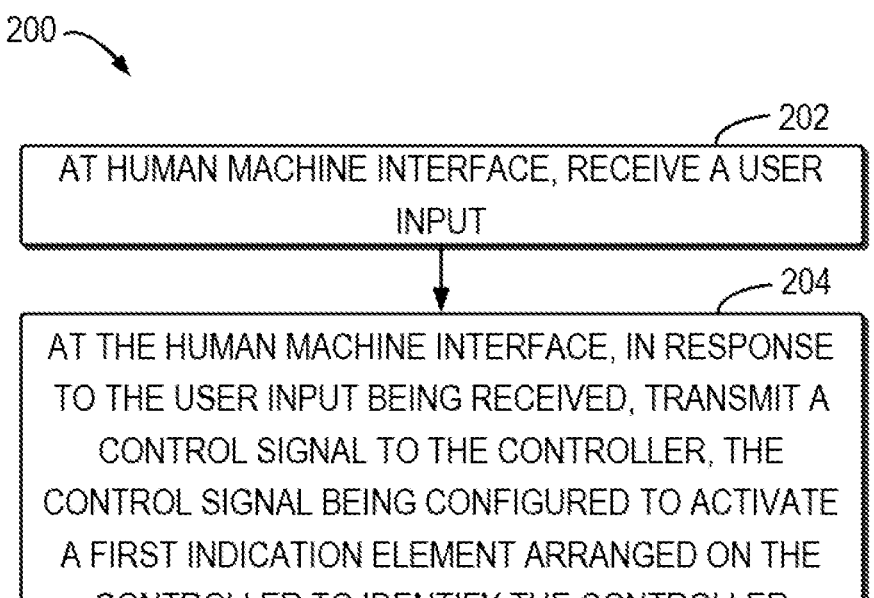

200 ⌐

202

AT HUMAN MACHINE INTERFACE, RECEIVE A USER INPUT

204

AT THE HUMAN MACHINE INTERFACE, IN RESPONSE TO THE USER INPUT BEING RECEIVED, TRANSMIT A CONTROL SIGNAL TO THE CONTROLLER, THE CONTROL SIGNAL BEING CONFIGURED TO ACTIVATE A FIRST INDICATION ELEMENT ARRANGED ON THE CONTROLLER TO IDENTIFY THE CONTROLLER

Fig. 2

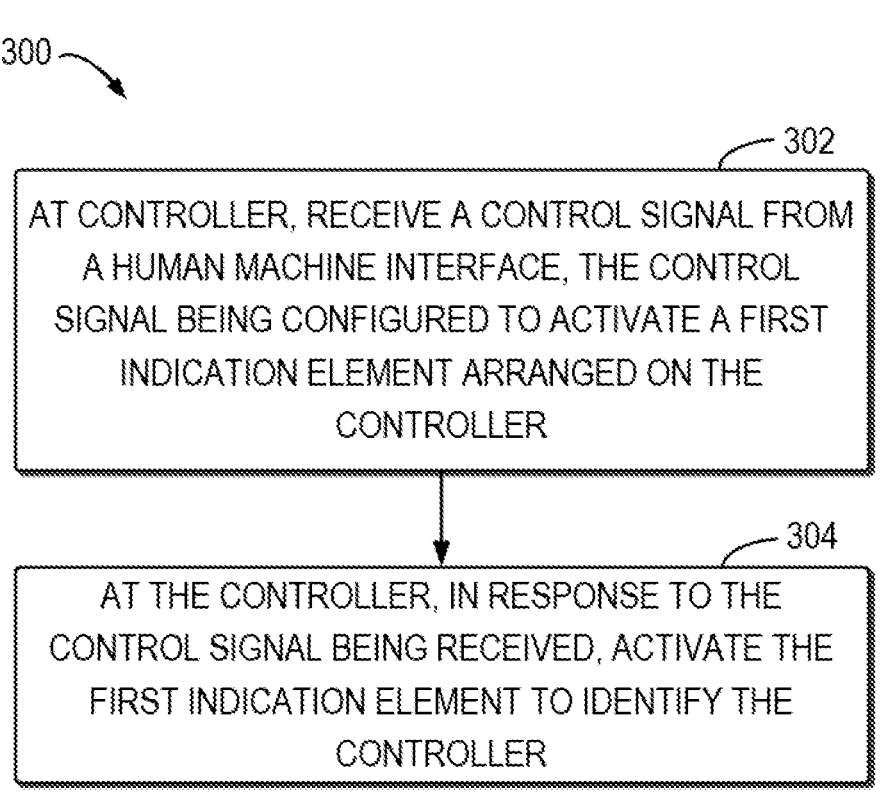

300 ⌐

302

AT CONTROLLER, RECEIVE A CONTROL SIGNAL FROM A HUMAN MACHINE INTERFACE, THE CONTROL SIGNAL BEING CONFIGURED TO ACTIVATE A FIRST INDICATION ELEMENT ARRANGED ON THE CONTROLLER

304

AT THE CONTROLLER, IN RESPONSE TO THE CONTROL SIGNAL BEING RECEIVED, ACTIVATE THE FIRST INDICATION ELEMENT TO IDENTIFY THE CONTROLLER

AT ROBOT, RECEIVE A ROBOT SIGNAL FROM CONTROLLER, THE ROBOT SIGNAL BEING CONFIGURED TO ACTIVATE A SECOND INDICATION ELEMENT ARRANGED ON THE ROBOT

404

AT THE ROBOT, IN RESPONSE TO THE ROBOT SIGNAL BEING RECEIVED, ACTIVATE THE SECOND INDICATION ELEMENT TO IDENTIFY THE ROBOT

102

502

USER INTERFACE

504

PROCESSOR

104

106

HUMAN MACHINE INTERFACE, CONTROLLER, ROBOT AND CORRESPONDING SYSTEM AND METHOD

CROSS-REFERENCE TO RELATED APPLICATIONS

This is a national stage application claiming priority to International patent application Serial No.: PCT/CN2020/132358, filed on Nov. 27, 2020; which is herein incorporated by reference in its entirety.

FIELD

Example embodiments of the present disclosure generally relate to the field of industrial robot, and in particular, to a human machine interface, a controller, a robot and corresponding system and method.

BACKGROUND

In the field of industrial robot, a robot can be controlled by a user to complete a particular task. The user may work with a human machine interface (HMI) to operate a controller, which in turn controls the robot according to the instructions from the user. The HMI may be connected to the controller with a cable and the controller may also be connected to the robot with another cable. The HMI, the controller and the robot may be provided within a station. However, the station may accommodate more than one robot and more than one controller. As the number of the controllers and the robots increases, the cables may be increased sharply. As a result, the user may find it difficult to figure out which controller is connected to a particular robot and which controller is connected to the HMI, and which robot is connected to the controller. Thus, how to identify the relations among the robot, controller and the HMI remains a challenge.

SUMMARY

In general, example embodiments of the present disclosure propose a solution for matching the human machine interface, the controller and the robot rapidly and conveniently.

In a first aspect, there is provided a method for use with a human machine interface. The human machine interface is configured to control a robot via a controller. The method comprises: at the human machine interface, receiving a user input; and at the human machine interface, in response to the user input being received, transmitting a control signal to the controller, the control signal being configured to activate a first indication element arranged on the controller to identify the controller.

In some example embodiments, the method further comprises: at the human machine interface, in response to the user input being received, transmitting an activation signal to the robot, the activation signal being configured to activate a second indication element arranged on the robot to identify the robot.

In some example embodiments, the first indication element is a light device, and activating the first indication element comprising: causing the light device to flash or emit light with a certain color.

In some example embodiments, the first indication element is a speaker, and activating the first indication element comprising: causing the speaker to make a sound.

In a second aspect, a method for use with a controller configured to control a robot is provided. The method comprises: at the controller, receiving a control signal from a human machine interface, the control signal being configured to activate a first indication element arranged on the controller; and at the controller, in response to the control signal being received, activating the first indication element to identify the controller.

In some example embodiments, the method further comprises: in response to the control signal being received, transmitting a robot signal to the robot, the robot signal being configured to activate a second indication element arranged on the robot to identify the robot.

In some example embodiments, the first indication element is a light device, and activating the first indication element comprising: causing the light device to flash or emit light with a certain color.

In some example embodiments, the first indication element is a speaker, and activating the first indication element comprising: causing the speaker to make a sound.

In a third aspect, a method for use with a robot configured to be controlled by a human machine interface via a controller is provided. The method comprises: at the robot, receiving a robot signal from the controller, the robot signal being configured to activate a second indication element arranged on the robot; and at the robot, in response to the robot signal being received, activating the second indication element to identify the robot.

In some example embodiments, the method further comprises: receiving an activation signal from the human machine interface; and in response to the activation signal being received, activating the second indication element to identify the robot.

In some example embodiments, the second indication element is a light device, and activating the second indication element comprising: causing the light device to flash or emit light with a certain color.

In some example embodiments, the second indication element is a speaker, and activating the second indication element comprising: causing the speaker to make a sound.

In a fourth aspect, a human machine interface configured to control a robot via a controller is provided. The human machine interface comprises a user interface configured to receive a user input; and at least one processor configured to transmit a control signal to the controller in response to the user input being received by the user interface, the control signal being configured to activate a first indication element arranged on the controller to identify the controller.

In some example embodiments, the at least one processor is further configured to: in response to the user input being received by the user interface, transmit an activation signal to the robot, the activation signal being configured to activate a second indication element arranged on the robot to identify the robot.

In some example embodiments, the first indication element is a light device, and activating the first indication element comprising: causing the light device to flash or emit light with a certain color.

In some example embodiments, the first indication element is a speaker, and activating the first indication element comprising: causing the speaker to make a sound.

In a fifth aspect, a controller configured to control a robot is provided. The controller comprising a first indication element; and at least one processor configured to: receive a control signal from a human machine interface, the control signal being configured to activate the first indication element arranged; and in response to the control signal being received, activate the first indication element to identify the controller.

In some example embodiments, the at least one processor is configured to: in response to the control signal being received, transmit a robot signal to the robot, the robot signal being configured to activate a second indication element arranged on the robot to identify the robot.

In some example embodiments, the first indication element is a light device, and activating the first indication element comprising: causing the light device to flash or emit light with a certain color.

In some example embodiments, the first indication element is a speaker, and activating the first indication element comprising: causing the speaker to make a sound.

In a sixth aspect, a robot configured to be controlled by a human machine interface via a controller is provided. The robot comprises: a second indication element; and at least one processor configured to: receive a robot signal from the controller, the robot signal being configured to activate the second indication element; and in response to the robot signal being received, activate the second indication element to identify the robot.

In some example embodiments, the at least one processor is configured to: receive an activation signal from the human machine interface; and in response to the activation signal being received, activate the second indication element.

In some example embodiments, the second indication element is a light device, and activating the second indication element comprising: causing the light device to flash or emit light with a certain color.

In some example embodiments, the second indication element is a speaker, and activating the second indication element comprising: causing the speaker to make a sound.

In a seventh aspect, a robotic system is provided. The robotic system comprises: a human machine interface of the fourth aspect, a controller of the fifth aspect and a robot of the sixth aspect.

According to embodiments of the present disclosure, the identification of the controller and/or the robot can be carried out rapidly and safely.

BRIEF DESCRIPTION OF THE DRAWINGS

Through the following detailed description with reference to the accompanying drawings, the above and other objectives, features and advantages of the example embodiments disclosed herein will become more comprehensible. In the drawings, several example embodiments disclosed herein will be illustrated in an exemplary and in a non-limiting manner, wherein:

FIG. 2 illustrates a flowchart of a method in accordance with an example embodiment of the present disclosure which may be used with a human machine interface;

FIG. 3 illustrates a flowchart of a method in accordance with an example embodiment of the present disclosure which may be used with a controller;

Throughout the drawings, the same or similar reference numerals represent the same or similar element.

DETAILED DESCRIPTION

Figure 1:
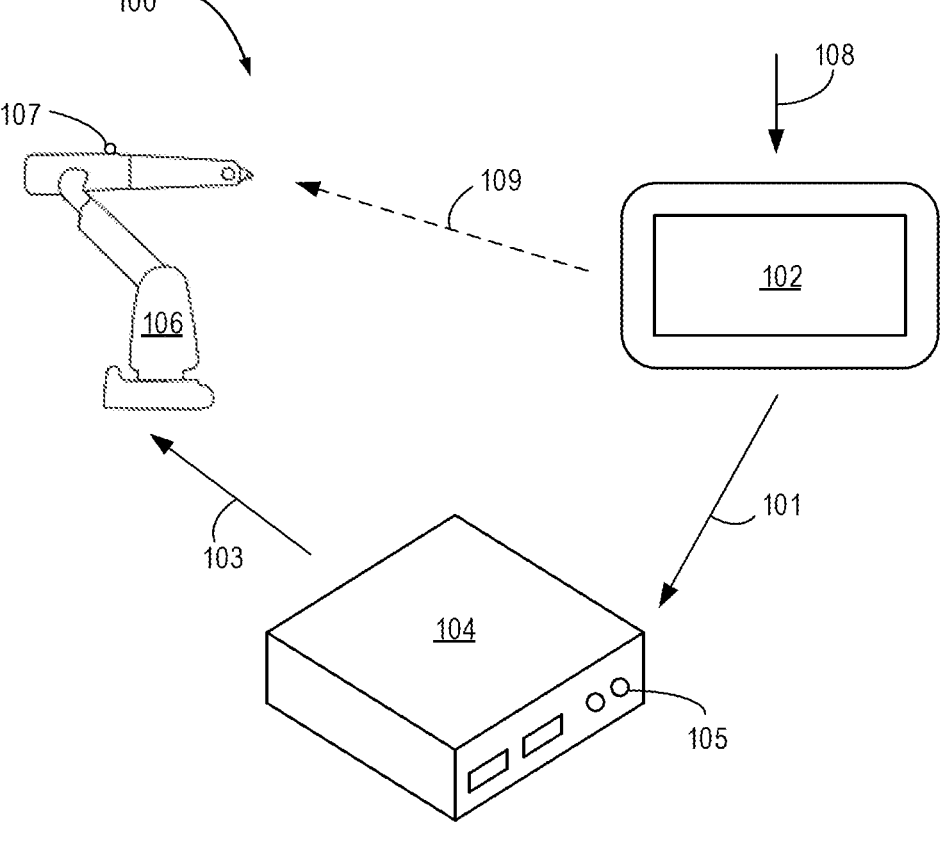
FIG. 1 illustrates an exemplary robotic system in which example embodiments of the present disclosure may be implemented.

Principles of the present disclosure will now be described with reference to some example embodiments. It is to be understood that these embodiments are described only for the purpose of illustration and to help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skill in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to apply such feature, structure, or characteristic in connection with other embodiments whether or not explicitly described.

It should be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As discussed above, if a plurality of human machine interfaces, controllers and robots are arranged within a station, it is necessary for the user to figure out which robot is being controlled by the human machine interface operated by the user. However, there may be a great number of cables, which may be placed disorderly. The cables may be tangled with each other, and it is hard for the user to figure out the cables, especially when the number of these components further increases.

Conventionally, if the user intends to look for the specific controller or the robot that are linked to the human machine interface operated by the user, he would have to find the clues along the cables. However, the cables may be messy and it takes the user a plenty of time to sort out the relations among these cables. The searching work is thus inefficient. Worse still, if the human machine interface, the controller and the robot have been turned on when looking for the clues, it is possible for the user to loosen the connection of the cables, thus interrupting the normal operation of those components.

According to embodiments of the present disclosure, when the users operates the human machine interface, the corresponding controller and/or the robot related to that human machine interface can be identified much easier and faster. The above idea may be implemented in various manners, as will be described in detail in the following paragraphs.

Example embodiments will be described in more details hereinafter in accordance with FIGS. 1-7.

FIG. 1 illustrates an exemplary robotic system 100 in which example embodiments of the present disclosure may be implemented. The robotic system 100 as illustrated generally comprises a human machine interface 102, a controller 104 and a robot 106. The human machine interface 102 is configured to control the robot 106 via the controller 104.

In some example embodiments, the human machine interface 102 as illustrated may be a teach pendant which can be held by the user. It is to be understood that this is merely an example, without suggesting any limitation as to the scope of the disclosure. For example, in other embodiments, the human machine interface 102 may be a desktop or a tablet. In some example embodiments, the controller 104 as illustrated may comprise an outer cabinet, which contains a number of control components inside the outer cabinet. The controller 104 comprises a first indication element 105, which can be used to identify the position of the controller 104. The robot 106 as illustrated may comprise one or more arms actuated to perform a particular action according to the instruction from the human machine interface 102. For example, the arms of the robot 106 may be controlled to grasp an object on a transmission belt.

FIG. 2 illustrates a flowchart of a method 200 in accordance with an example embodiment of the present disclosure which may be used with the human machine interface 102.

As illustrated, at block 202, a user input 108 is received at the human machine interface 102. In some example embodiments, the human machine interface 102 may comprise a button (not shown in the figures) to allow the user input 108 to be input to the human machine interface 102. In some embodiments, if the human machine interface 102 is a teach pendant, the button may be physical button provided at a surface of the teach pendant. In some embodiments, the button may be also a virtual button on the screen of the teach pendant.

It is to be understood that this is only for the purpose of illustration, without suggesting any limitations. In other embodiments, if the human machine interface 102 is a computer, the user input 108 may be received via a keyboard or a mouse.

At block 204, when the user input 108 is received, a control signal 101 is transmitted to the controller 104. The control signal 101 is adapted to activate the first indication element 105 of the controller 104.

According to embodiments of the present disclosure, when the user operates the human machine interface 102 to look for the controller 104, the first indication element 105 on the controller 104 may be activated to allow the user to identify the controller 104. In this way, there is no need for the user to look for the controller 104 along the cables.

In some example embodiments, the first indication element 105 may be a light device, such as a LED. In this embodiment, the LED on the controller 104 will show an indication to allow the user to be visually aware of the location of controller 104. For example, the first indication element 105 may emit the light with a particular color or flash at a particular frequency, which can be customized by the user. In this way, the user can intuitively find out the controller 104 visually.

In other embodiments, the first indication element 105 may be a speaker, which may make a particular sound according to the setting by the user. For example, the speaker may beep with a specific frequency. In this way, the user can be auditorily informed of the location of the controller 104

In some example embodiments, at the human machine interface 102, when the user input is received, an activation signal 109 may be transmitted to the robot 106. With reference back to FIG. 1, the robot 106 may comprises a second indication element 107 to identify the robot 106. The activation signal 109 may be configured to activate the second indication element 107.

In this way, in the robotic system 100, the second indication element 107 is provided to give an indication to the user to allow the user to identify the location of the robot 106 in a rapid and intuitive manner.

FIG. 3 illustrates a flowchart of a method 300 in accordance with an example embodiment of the present disclosure which may be used with the controller 104.

At block 302, a control signal 101 from the human machine interface 102 is received at the controller 104. The control signal 101 is configured to activate the first indication element 105 arranged on the controller 104 to identify the controller 104. At block 304, the first indication element 105 is activated when the control signal 101 is received. In this way, the controller 104 can be found quicker.

In some example embodiments, the method 300 further comprises: in response to the control signal 101 being received, transmitting a robot signal 103 to the robot 106. The robot signal 103 is configured to activate the second indication element 107 arranged on the robot 106 to identify the robot 106.

In this way, the robot 106 can be identified by means of the controller 104.

In some example embodiments, the second indication element 107 may operate in a similar manner with the first indication element 105. In other embodiments, the first and second indication elements 105, 107 may operate in different manners. For example, in some example embodiments, the second indication element 107 may be a light device, such as a LED. The LED on the robot 106 will show an indication to allow the user to be aware of the location of the robot 106. For example, the second indication element 107 may emit the light with a particular color or flash at a particular frequency, which can be also customized by the user. In this way, the user can directly see and figure out the matched controller 104 and robot 106.

In other embodiments, the second indication element 107 may be a speaker, which may make a particular sound according to the setting by the user. For example, the speaker may beep with a specific frequency. In this way, the user can hear the voice from the robot 106 to help the user pick up the corresponding robot 106.

In some embodiment, the first indication element 105 and the second indication element 107 may operate jointly. For example, in an example embodiment, if the user presses the button, the second indication element 107 on the robot 106 and the first indication element 105 on the controller 104 will be activated at the same time. For example, if the indication elements 107, 105 are implemented as LEDs, the LED on the robot 106 and the LED on the controller 104 will emit the same type of light simultaneously. In a further embodiment, the lighting device on the robot 106 and the lighting device on the controller 104 may flash at the same or different frequency to allow the user to match the controller 104, the human machine interface 102 and the robot 106.

In this way, the user can directly know the locations of both the robot 106 and the controller 104.

Figure 4:
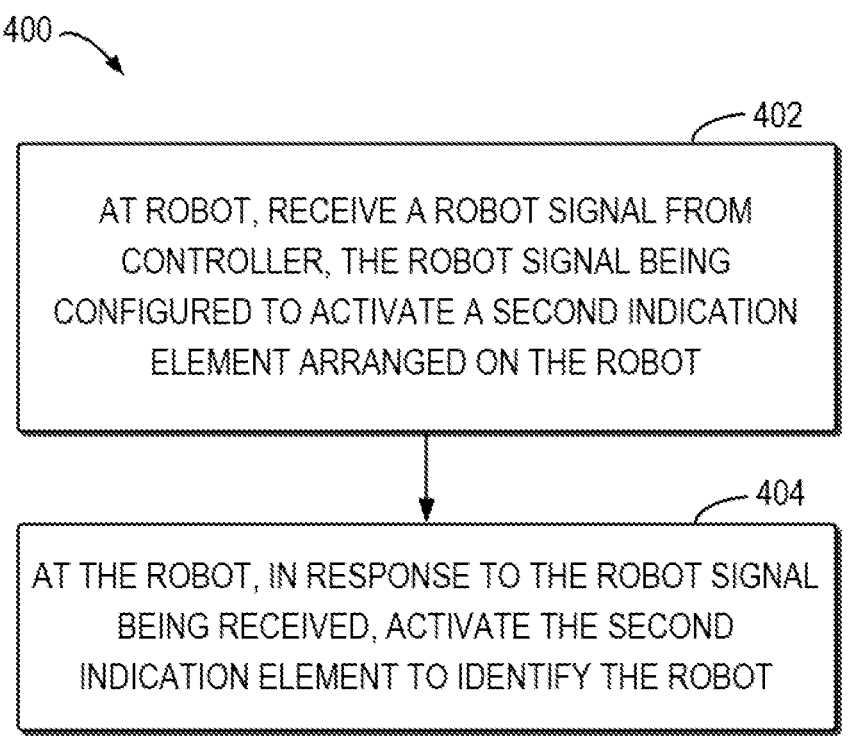
FIG. 4 illustrates a flowchart of a method in accordance with an example embodiment of the present disclosure which may be used with a robot.

FIG. 4 illustrates a flowchart of a method 400 in accordance with an example embodiment of the present disclosure which may be used with the robot 106.

At block 402, a robot signal 103 is received from the controller 104 at the robot 106. The robot signal 103 is configured to activate the second indication element 107 arranged on the robot 106 to identify the robot 106. At block 404, in response to the robot signal 103 being received at the robot 106, the second indication element 107 is activated to identify the robot 106.

In some example embodiments, the method 400 may further comprise receiving the activation signal 109 from the human machine interface 102. When the activation signal 109 is received at the robot 106, the second indication element 107 is activated to identify the robot 106. In this way, if it is unnecessary to figure out the position of the controller 104, its identification can be skipped. In other words, the identification of the location of the robot 106 can be achieved only by using the human machine interface 102. In the way, the user does not need to search along the cables, which would enhance the safety in the robotic system 100.

Figure 5:
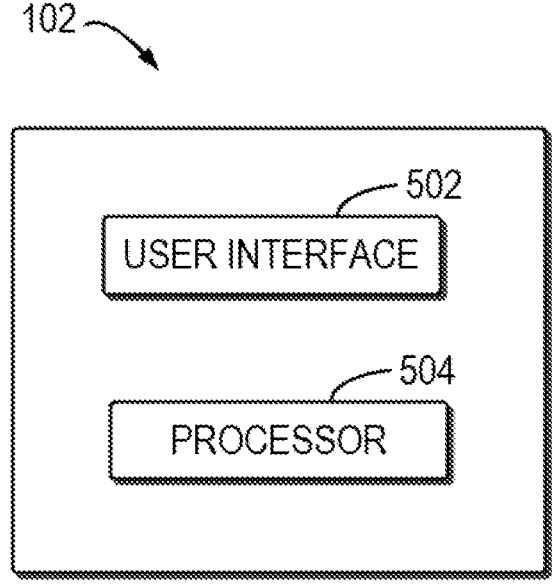
FIG. 5 illustrates a block diagram of a human machine interface in accordance with an example embodiment of the present disclosure.

FIG. 5 illustrates a block diagram of the human machine interface 102 in accordance with an example embodiment of the present disclosure. The method 200 described as above may be executed on the human machine interface 102.

The human machine interface 102 as illustrated generally comprises a user interface 502 and at least one processor 504. The user interface 502 is configured to receive a user input 108. The at least one processor 504 is configured to transmit a control signal 101 to the controller 104 in response to the user input 108 being received by the user interface. The control signal 101 is configured to activate the first indication element 105 arranged on the controller 104 to identify the controller 104.

In some example embodiments, the at least one processor 504 may be further configured to transmit an activation signal 109 to the robot 106 in response to the user input 108 being received by the user interface. The activation signal 109 may be configured to activate the second indication element 107 arranged on the robot 106 to identify the robot 106. In this manner, the risk brought about by the loose connections of the cable can be reduced.

Figure 6:
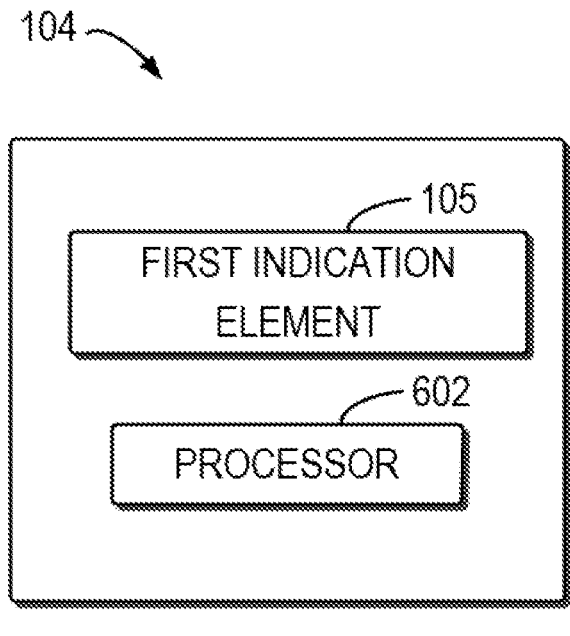
FIG. 6 illustrates a block diagram of a controller in accordance with an example embodiment of the present disclosure.

FIG. 6 illustrates a block diagram of the controller 104 in accordance with an example embodiment of the present disclosure. The method 300 as described above may be executed on the controller 104.

The controller 104 as illustrated generally comprises a first indication element 105 and at least one processor 602. The at least one processor 602 is configured to: receive a control signal 101 from the human machine interface 102. The control signal 101 is configured to activate the first indication element 105 arranged on the controller 104 to identify the controller 104. The at least one processor 602 may be further configured to activate the first indication element 105 at the controller 104 when the control signal 101 is received.

In some example embodiments, the at least one processor 602 is configured to transmit a robot signal 103 to the robot 106 when the control signal 101 is received. The robot signal 103 is configured to activate the second indication element 107 arranged on the robot 106 to identify the robot 106. In this manner, the location of the robot 106 can be obtained conveniently.

In some example embodiments, as illustrated in FIG. 1, the second indication element 107 may be located on an upper arm of the robot 106. In this way, the user can see the second indication element 107 easier.

Figure 7:
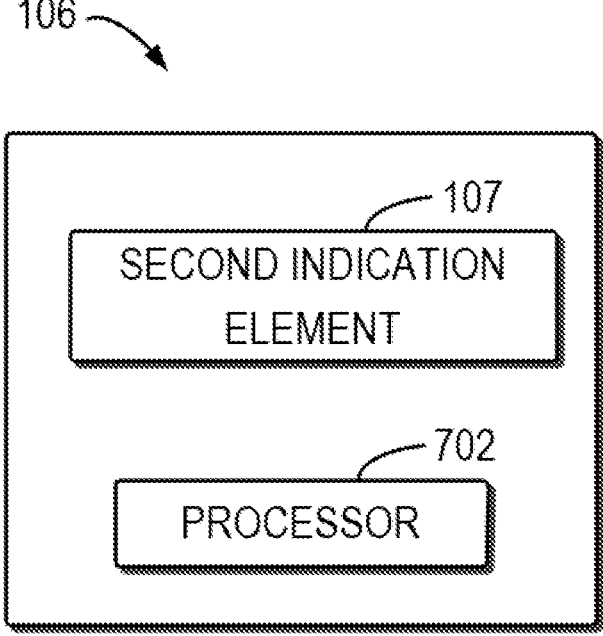
FIG. 7 illustrates a block diagram of a robot in accordance with an example embodiment of the present disclosure.

FIG. 7 illustrates a block diagram of the robot 106 in accordance with an example embodiment of the present disclosure. The method 400 as described above may be executed on the robot 106.

The robot 106 as illustrated generally comprises a second indication element 107 and at least one processor 702. The at least one processor 702 is configured to: receive a robot signal 103 from the controller 104 and the robot signal 103 is configured to activate the second indication element 107. The at least one processor 702 is further configured to activate the second indication element 107 to identify the robot 106 when the robot signal 103 is received.

In some example embodiments, the at least one processor 702 is configured to: receive an activation signal 109 from the human machine interface 102; and activate the second indication element 107 when the activation signal 109 is activated. In this way, the robot 106 can be identified without the controller 104.

In other example embodiments, there may be no processor 702 inside the robot 106. In such an example, the robot 106 is directly connected to the controller 104 through a cable, and the second indication element 107 on the robot 106 is controlled directly by the controller 104 through an I/O connection in the cable.

It is to be understood that the example embodiments described with reference to the methods 200, 300 or 400 may be combined with the embodiments described with reference to the human machine interface 102, the controller 104 or the robot 106. Some of the example embodiments will not be described in details for brevity.

In some example embodiments, the human machine interface 102 and the controller 104 may be connected by cables. In other example embodiments, the human machine interface 102 and the controller 104 may be connected wirelessly.

Compared to the conventional approaches, embodiments of the present disclosure provide a method to find the robot 106 or the controller 104 corresponding to the human machine interface 102 in an easy and efficient manner. Moreover, the operation would be much safer. This is because the user does not have to touch any cable or the controller 104 or the robot 106.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but is not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for use with a human machine interface configured to control a robot via a controller, comprising:

at the human machine interface, receiving a user input; and at the human machine interface, in response to the user input being received;

10 transmitting a control signal to the controller, the control signal being configured to activate a first indication element arranged on the controller to identify the controller;

wherein the first indication element is at least one of a light device or a speaker; and transmitting an activation signal to the robot, the activation signal being configured to activate a second indication element arranged on the robot to identify the robot;

wherein the second indication element is at least one of a light device or a speaker.

2. The method of claim 1, wherein the first indication element is the light device, and wherein activating the first indication element comprising: causing the light device to flash or emit light with a certain color.

3. The method of claim 1, wherein the first indication element is the speaker, and wherein activating the first indication element comprising: causing the speaker to make a sound.

4. A method for use with a controller configured to control a robot, comprising:

at the controller, receiving a control signal from a human machine interface, the control signal being configured to activate a first indication element arranged on the controller;

wherein the first indication element is at least one of a light device or a speaker;

at the controller, in response to the control signal being received, activating the first indication element to identify the controller; and in response to the control signal being received, transmitting a robot signal to the robot, the robot signal being configured to activate a second indication element arranged on the robot to identify the robot;

wherein the second indication element is at least one of a light device or a speaker.

5. The method of claim 4, wherein the first indication element is the light device, and wherein activating the first indication element comprising: causing the light device to flash or emit light with a certain color.

6. The method of claim 4, wherein the first indication element is the speaker, and wherein activating the first indication element comprising: causing the speaker to make a sound.

7. A method for use with a robot configured to be controlled by a human machine interface via a controller, comprising:

at the robot, receiving a robot signal from the controller, the robot signal being configured to activate a second indication element arranged on the robot;

wherein the second indication element is at least one of a light device or a speaker; and at the robot, in response to the robot signal being received, activating the second indication element to identify the robot.

8. The method of claim 7, further comprising:

receiving an activation signal from the human machine interface; and in response to the activation signal being received, activating the second indication element to identify the robot.

9. The method of claim 7, wherein the second indication element is the light device, and wherein activating the second indication element comprising: causing the light device to flash or emit light with a certain color.

10. The method of claim 7, wherein the second indication element is the speaker, and
wherein activating the second indication element comprising: causing the speaker to make a sound.

11. A human machine interface configured to control a robot via a controller, comprising:
a user interface configured to receive a user input; and
at least one processor configured to:
transmit a control signal to the controller in response to the user input being received by the user interface, the control signal being configured to activate a first indication element arranged on the controller to identify the controller;
wherein the first indication element is at least one of a light device or a speaker; and
in response to the user input being received by the user interface, transmit an activation signal to the robot, the activation signal being configured to activate a second indication element arranged on the robot to identify the robot;
wherein the second indication element is at least one of a light device or a speaker.

12. The controller of claim 11, wherein the first indication element is the light device, and
wherein activating the first indication element comprising: causing the light device to flash or emit light with a certain color.

13. The controller of claim 11, wherein the first indication element is the speaker, and
wherein activating the first indication element comprising: causing the speaker to make a sound.

14. A controller configured to control a robot, comprising:
a first indication element; and
at least one processor configured to:
receive a control signal from a human machine interface, the control signal being configured to activate the first indication element;
wherein the first indication element is at least one of a light device or a speaker;
in response to the control signal being received, activate the first indication element to identify the controller; and
in response to the control signal being received, transmit a robot signal to the robot, the robot signal being configured to activate a second indication element arranged on the robot to identify the robot;
wherein the second indication element is at least one of a light device or a speaker.

15. The controller of claim 14, wherein the first indication element is the light device, and
wherein activating the first indication element comprising: causing the light device to flash or emit light with a certain color.

16. The controller of claim 14, wherein the first indication element is the speaker, and
wherein activating the first indication element comprising: causing the speaker to make a sound.

17. A robot configured to be controlled by a human machine interface via a controller, comprising:
a second indication element; and
at least one processor configured to:

receive a robot signal from the controller, the robot signal being configured to activate the second indication element;
wherein the second indication element is at least one of a light device or a speaker; and
in response to the robot signal being received, activate the second indication element to identify the robot.

18. The robot of claim 17, wherein the at least one processor is configured to:
receive an activation signal from the human machine interface; and
in response to the activation signal being received, activate the second indication element.

19. The robot of claim 17, wherein the second indication element is the light device, and
wherein activating the second indication element comprising: causing the light device to flash or emit light with a certain color.

20. The robot of claim 17, wherein the second indication element is the speaker, and
wherein activating the second indication element comprising: causing the speaker to make a sound.

21. A robotic system, comprising:
a human machine interface;
a controller; and
a robot,
wherein the human machine interface is configured to control the robot via the controller,
the human machine interface comprises:
a user interface configured to receive a user input, and
at least one processor configured to transmit a control signal to the controller in response to the user input being received by the user interface, the control signal being configured to activate a first indication element arranged on the controller to identify the controller,
wherein the first indication element is at least one of a light device or a speaker,
wherein the controller is configured to control the robot,
the controller comprises:
the first indication element; and
at least one processor configured to:
receive a control signal from a human machine interface, the control signal being configured to activate the first indication element, and
in response to the control signal being received, activate the first indication element to identify the controller,
wherein the robot is configured to be controlled by the human machine interface via the controller,
the robot comprises:
a second indication element;
wherein the second indication element is at least one of a light device or a speaker; and
at least one processor configured to:
receive a robot signal from the controller, the robot signal being configured to activate the second indication element, and
in response to the robot signal being received, activate the second indication element to identify the robot.

* * * * *